G. J. Colby,
Wringer,
No. 2,408. Reissued Dec. 4, 1866.
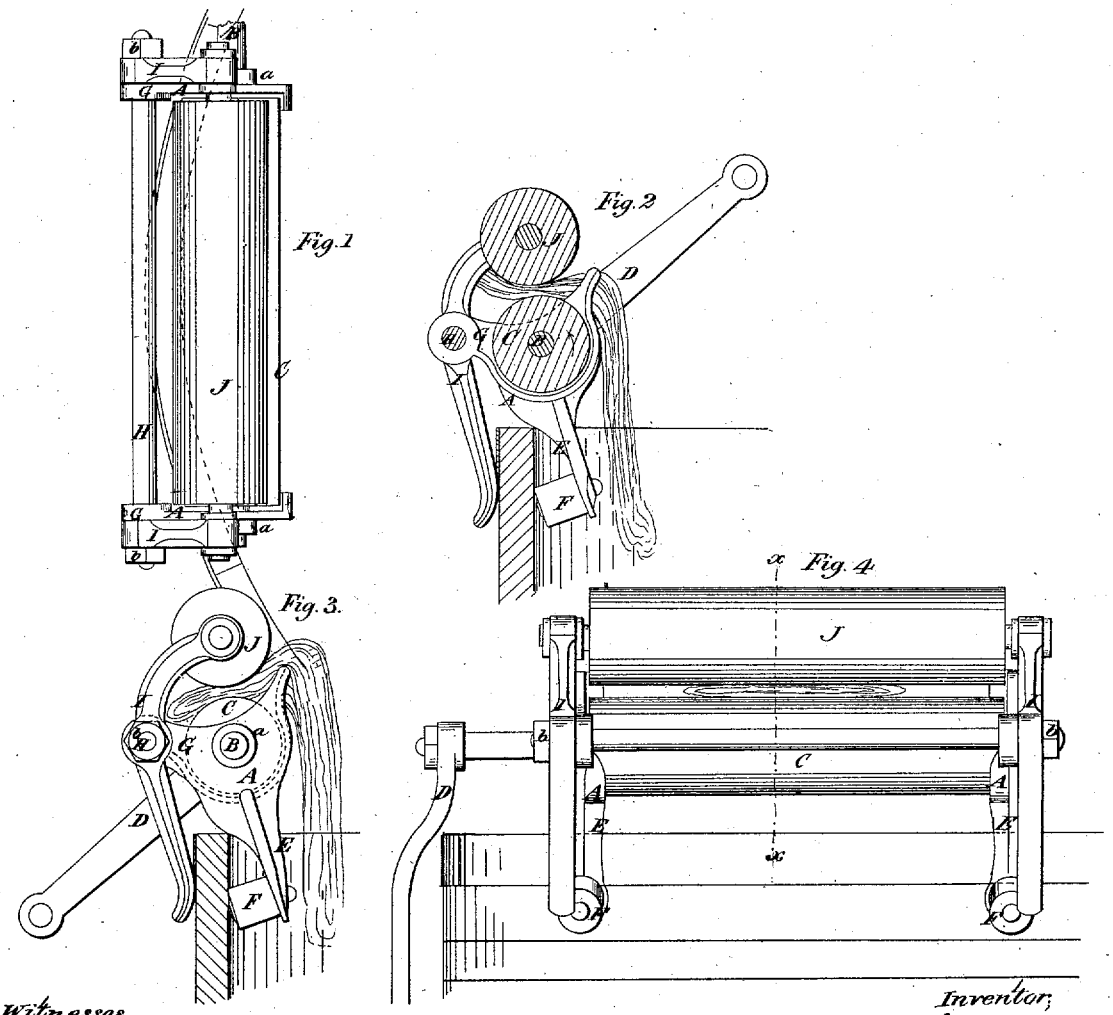
Witnesses
W. Crosby
R. S. Spencer
Inventor;
Geo. J. Colby
per Munn & Co
Attorneys
N. PETERS, PHOTO-LITHOGRAPHER, WASHINGTON, D. C.

United States Patent Office.

IMPROVED CLOTHES WRINGER.

COLBY BROTHERS & COMPANY, ASSIGNEES OF GEORGE J. COLBY, OF WATERBURY, VERMONT.

*Letters Patent No.* 30,802, *dated December* 4, 1860; *reissue No.* 2,408, *dated December* 4, 1866.

SPECIFICATION.

TO ALL WHOM IT MAY CONCERN:

Be it known that GEORGE J. COLBY, of Waterbury, in the county of Washington, and State of Vermont, did invent a new and improved Device for Wringing Clothes; and I do hereby declare the following to be a full, clear, and exact description of the same, reference being had to the accompanying drawings, in which—

Figure 1 is a plan view of my invention.

Figure 2 is a transverse section of the same taken on line *x—x* of fig. 4.

Figure 3 is an end elevation of the same.

Figure 4 is a side elevation of the same.

The nature of this invention consists, first, in the use of a non-corrosive metallic substance in constructing the frame of a clothes wringer, so that the clothes shall not be liable to injury from rust, as has been the case hitherto with machines having metallic frames; second, in making the rollers of a wringer self-adjusting, as regards mutual pressure, without the use of movable cams, screws, wedges, &c.; third, inconstructing the frame so that it shall be self-adjusting to the side of the tub, and so that the act of forcing a mass of clothing between the rollers shall cause the machine to be more firmly clamped to the tub or other vessel. That others may fully understand the construction and operation of my invention, I will more particularly describe it.

A A are the end pieces of the frame. The shaft B, upon which is the elastic roller C, has its bearings in said end pieces, and is revolved by means of the crank D. The end pieces A A are connected together partly by the shaft B and partly by the rod H, which passes through the arms, G G. The ends of the rod H also form bearings for the arms I I, which carry at their upper portions the shaft of the upper roller, J, between which and the roller C the clothes are passed while the water is being pressed from them. The end pieces A A are each provided with a tang or arm, E, which extends downward, and when in position on the tub or other vessel presses against the side of the wall thereof, as shown in figs. 2, 3, and 4, while the other side is pressed by the lower extremity of the arm I, and the edge of the tub is thus clamped between these parts E and I. The rollers C and J are perceived to be upon the ends of two simple levers, which are pivoted together at H, figs. 2 and 3. When the implement is in position the opposing ends of these levers grasp the side of the tub between them with sufficient pressure to hold the machine firmly in place. This is because the elastic rollers C and J are pressed together and forced to yield a little to permit the ends of the levers or tangs E and I to pass over the edge of the tub, as described. The rollers C and J are thus adjusted in regard to mutual pressure by the act of attaching the instrument to the tub, and without the use of any separate or movable appliances, such as cams, screws, or wedges. For these reasons I call my rollers self-adjusting. It is also evident that when a mass of cloth, or other material, is passing between the rollers C and J, they will be forced away from each other, and the ends of the levers I and E will be correspondingly forced toward each other, so as to grip the side of the tub still more firmly; and the thicker the mass of cloth passing between these rollers the more firmly will the implement be clamped. There are arms, E and I, at each end of the wringer frame, and their inner faces are of such shape that a straight or curved surface may pass between them with equal facility, as is clearly shown by the various figures in the drawings. But as the clothes passing between the rollers will sometimes accumulate at one point to such a thickness as to render it impossible for them to pass through without great difficulty, or even danger to the machine, I have provided a spring, F, which is so placed that the rollers may have a motion away from each other sufficient to relieve them at times when their own elasticity is not sufficient. The nuts *b b* secure the rod H in place and prevent the arms I I from becoming displaced. Hitherto wringing machines have been constructed generally with wooden frames, but these, though not liable to injure the clothes, are themselves liable to injury from the action of water, and besides, not being durable, are objectionable on account of their size and inconvenience in handling. Iron frames have also been used to some extent, being covered with paint, varnish, or lacquer to protect the iron surface from the action of water. These means of preservation are insufficient, as is well known, and as a consequence the clothes are soon liable to injury from iron rust when such frames are used. To obviate these objections and difficulties, to dispense with a cumbersome wooden frame, and to secure a metallic frame which should be unobjectionable in every particular, light, self-adjusting, and not liable to rust, was the object of this invention. To accomplish these purposes, I construct my frame of metal, with the functions described, the clothing being protected by making the exposed surfaces or parts of brass, or its equivalent non-corrosive metallic substance. I do not claim the use of elastic pressure-rollers for expressing water from clothes, for they have been previously used for similar purposes; neither do I claim constructing a wringing machine with a frame of metal, the same having been done before.

Having described the said invention, what we claim as new, and desire to secure by Letters Patent, is—

1. The frame A I of a wringing machine, with elastic rollers C J, and the springs F, or their equivalents, so as to be self-adjusting in regard to mutual pressure of the rollers, without the use of wedges, cams, or screws, substantially as and for the purpose set forth.

2. The construction of clothes wringers, with the tangs E E, pivoted arms I I, and rollers C J, or their equivalents, arranged so that the act of compressing the clothes between the rollers will cause the device to clamp itself firmly to the tub or other article, substantially as herein shown and set forth.

GEO. J. COLBY.

Witnesses:

HORATIO MOFFITT,

CURTIS WELLS.